(12) United States Patent
Gibbs et al.

(10) Patent No.: US 6,389,355 B1
(45) Date of Patent: May 14, 2002

(54) METHODS AND APPARATUS FOR GRAPHICAL DISPLAY AND EDITING OF FLIGHT PLANS

(75) Inventors: Michael J. Gibbs, Phoenix; Mike B. Adams, Jr., Scottsdale; Karl L. Chase; Daniel E. Lewis, both of Glendale; Daniel E. McCrobie; Debi Van Omen, both of Scottsdale, all of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/660,343

(22) Filed: Sep. 14, 2000

Related U.S. Application Data

(60) Provisional application No. 60/153,900, filed on Sep. 14, 1999.

(51) Int. Cl.[7] .............................................. G01C 21/12
(52) U.S. Cl. ......................... 701/206; 701/14; 434/38; 434/43
(58) Field of Search ............................. 701/4, 7, 10, 14, 701/206; 434/30, 35, 38, 43; 340/945, 963, 970, 971

(56) References Cited

U.S. PATENT DOCUMENTS 4,604,711 A * 8/1986 Benn et al. ................... 701/14
5,475,594 A * 12/1995 Oder et al. ................... 701/14

* cited by examiner

*Primary Examiner*—Yonel Beaulieu

(57) ABSTRACT

Systems and methods are provided for an integrated graphical user interface which facilitates the display and editing of aircraft flight-plan data. A user (e.g., a pilot) located within the aircraft provides input to a processor through a cursor control device and receives visual feedback via a display produced by a monitor. The display includes various graphical elements associated with the lateral position, vertical position, flight-plan and/or other indicia of the aircraft's operational state as determined from avionics data and/or various data sources. Through use of the cursor control device, the user may modify the flight-plan and/or other such indicia graphically in accordance with feedback provided by the display. In one embodiment, the display includes a lateral view, a vertical profile view, and a hot-map view configured to simplify the display and editing of the aircraft's flight-plan data.

26 Claims, 20 Drawing Sheets

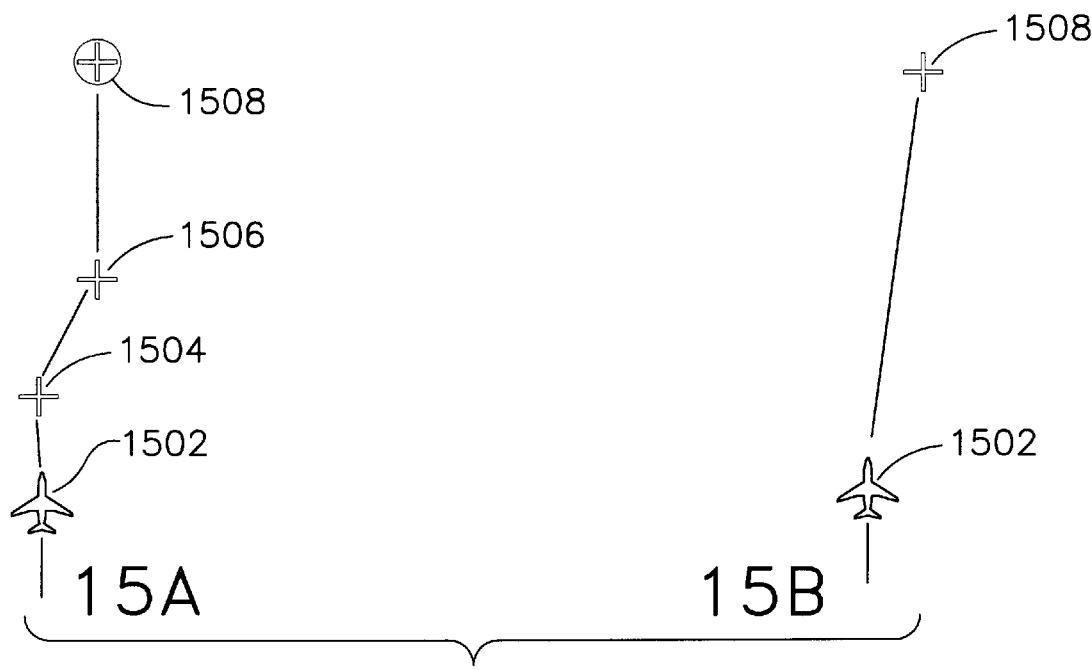
FIG. 15 "DIRECT TO"
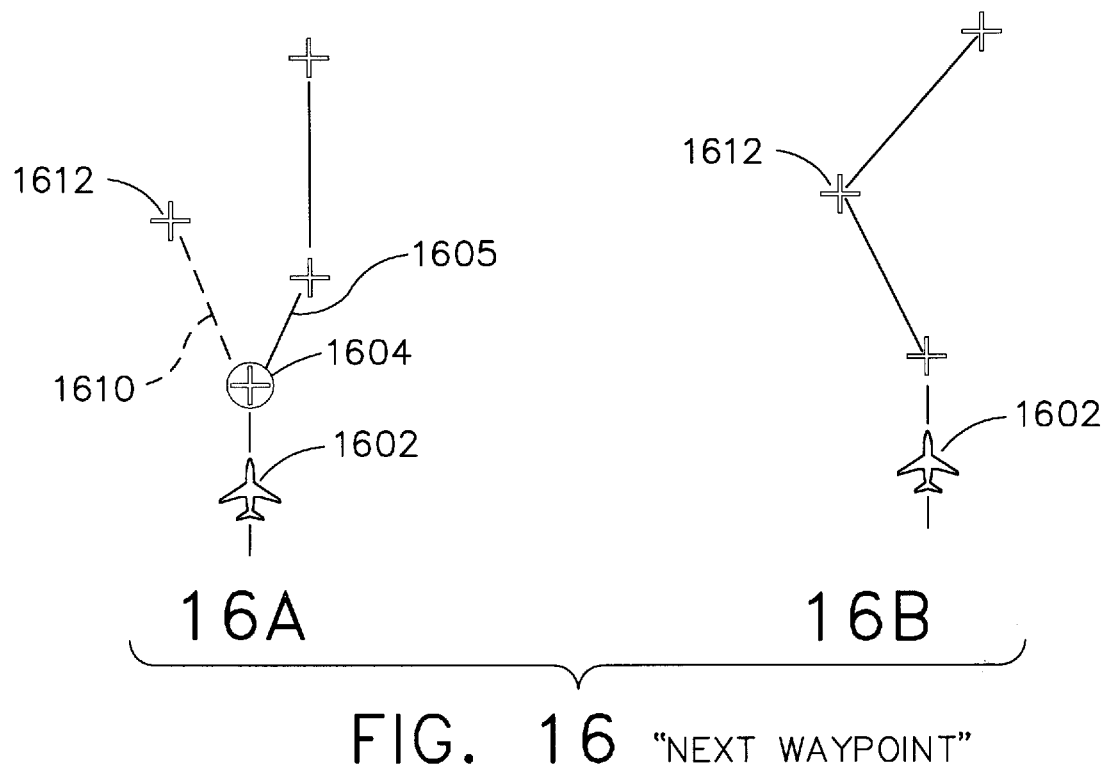
FIG. 16 "NEXT WAYPOINT"

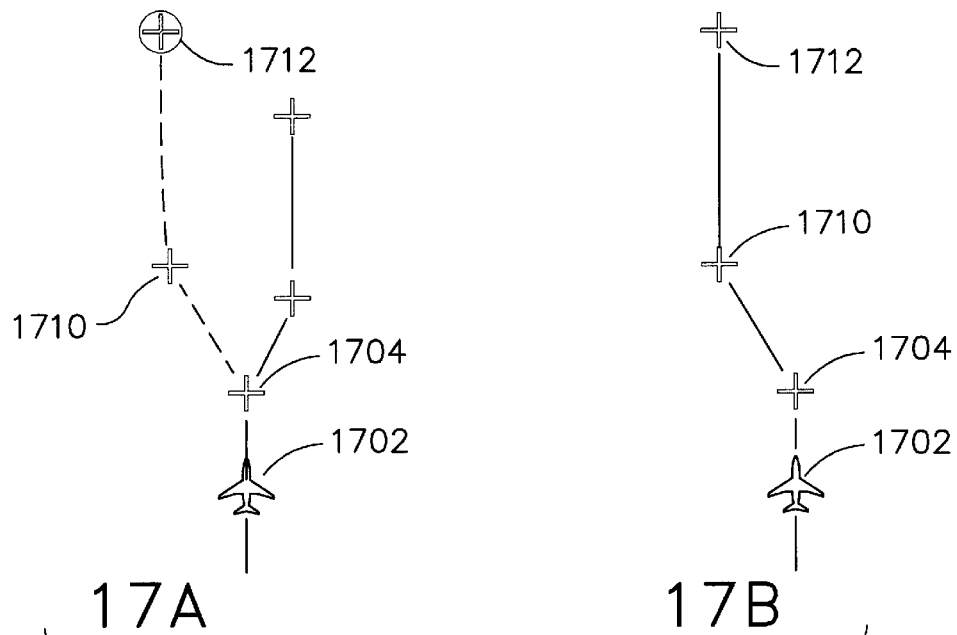
FIG. 17 "DIVERT"
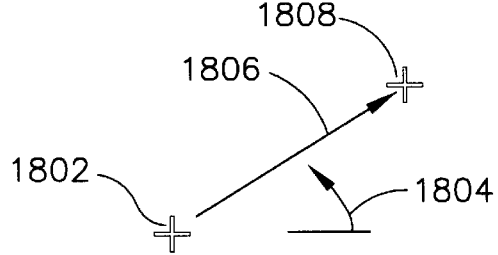
FIG. 18 "P/B/P"
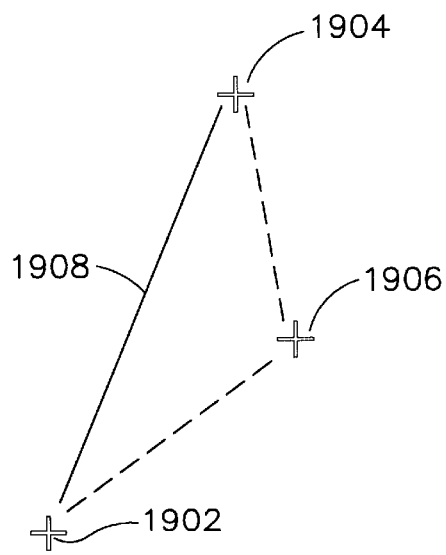
FIG. 19 "INSERT"

METHODS AND APPARATUS FOR GRAPHICAL DISPLAY AND EDITING OF FLIGHT PLANS

CROSS-REFERENCE TO RELATED APPLICATIONS

This application claims the benefit of U.S. Provisional Patent Application Ser. No. 60/153,900, filed Sep. 14, 1999, the contents of which are hereby incorporated by reference.

STATEMENT REGARDING FEDERALLY SPONSORED RESEARCH OR DEVELOPMENT

The invention described herein was made in the performance of work under NASA Contract No. NAS1-20219, TASK 10 and is subject to the provisions of Section 305 of the National Aeronautics and Space Act of 1958 (42 U.S.C. 2457).

BACKGROUND OF THE INVENTION

1. Technical Field

The present invention relates, generally, to aircraft cockpit displays and, more particularly, to graphical methods for displaying and editing flight-plan information.

2. Background Information

Aircraft flight displays continue to advance in sophistication, achieving increasingly higher levels of information density and, consequently, presenting a greater amount of visual information to be perceived and understood by the operator. In many applications, it is important that visual displays provide a proper cognitive mapping between what the operator is trying to achieve and the information available to accomplish the task. As a result, such systems increasingly utilize human-factor design principles in order to build instrumentation and controls that work cooperatively with human operators. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronic displays can be found in FAA Advisory Circular 20–88A, *Guidelines on the Marking of Aircraft Powerplant Instruments* (September 1985).

One area in particular that has not profited in advances in graphical user interfaces is the field of aircraft flight management systems. Specifically, in current generation aircraft, flight plan entry and editing continues to be performed using cumbersome, text-based techniques which have not changed significantly in the decade. As a result, flight crews frequently complain that current flight management systems (FMS) are non-intuitive, difficult to interpret, and require too much heads-down time. Indeed, due to the high cockpit workload involved, many flight crews abandon the FMS altogether, choosing instead to fly the aircraft using the autopilot.

Methods are therefore needed in order to overcome these and other limitations of the prior art. Specifically, there is a long felt need for an interface to flight management systems which is intuitive and easy to use.

BRIEF SUMMARY OF THE INVENTION

The present invention provides systems and methods for an integrated graphical user interface which facilitates the display and editing of aircraft flight-plan data. In accordance with various aspects of the present invention, a user (e.g., a pilot) located within the aircraft provides input to a processor through a cursor control device and receives visual feedback via a display produced by a monitor. The display includes various graphical elements associated with the lateral position, vertical position, flight-plan and/or other indicia of the aircraft's operational state as determined from avionics data and/or various data sources. Through use of the cursor control device, the user may modify the flight-plan and/or other such indicia graphically in accordance with feedback provided by the display. In one embodiment, the display includes a lateral view, a vertical profile view, and a hot-map view configured to simplify the display and editing of the aircraft's flight-plan data.

BRIEF DESCRIPTION OF THE SEVERAL VIEWS OF THE DRAWINGS

The subject invention will hereinafter be described in conjunction with the appended drawing figures, wherein like numerals denote like elements, and:

FIGS. 15–19 depict various options for editing one or more waypoints associated with a flight plan.

DETAILED DESCRIPTION OF PREFERRED EXEMPLARY EMBODIMENTS

Systems and methods in accordance with various aspects of the present invention provide an improved graphical user interface for display and editing of aircraft flight-plan data. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein.

Figure 1:
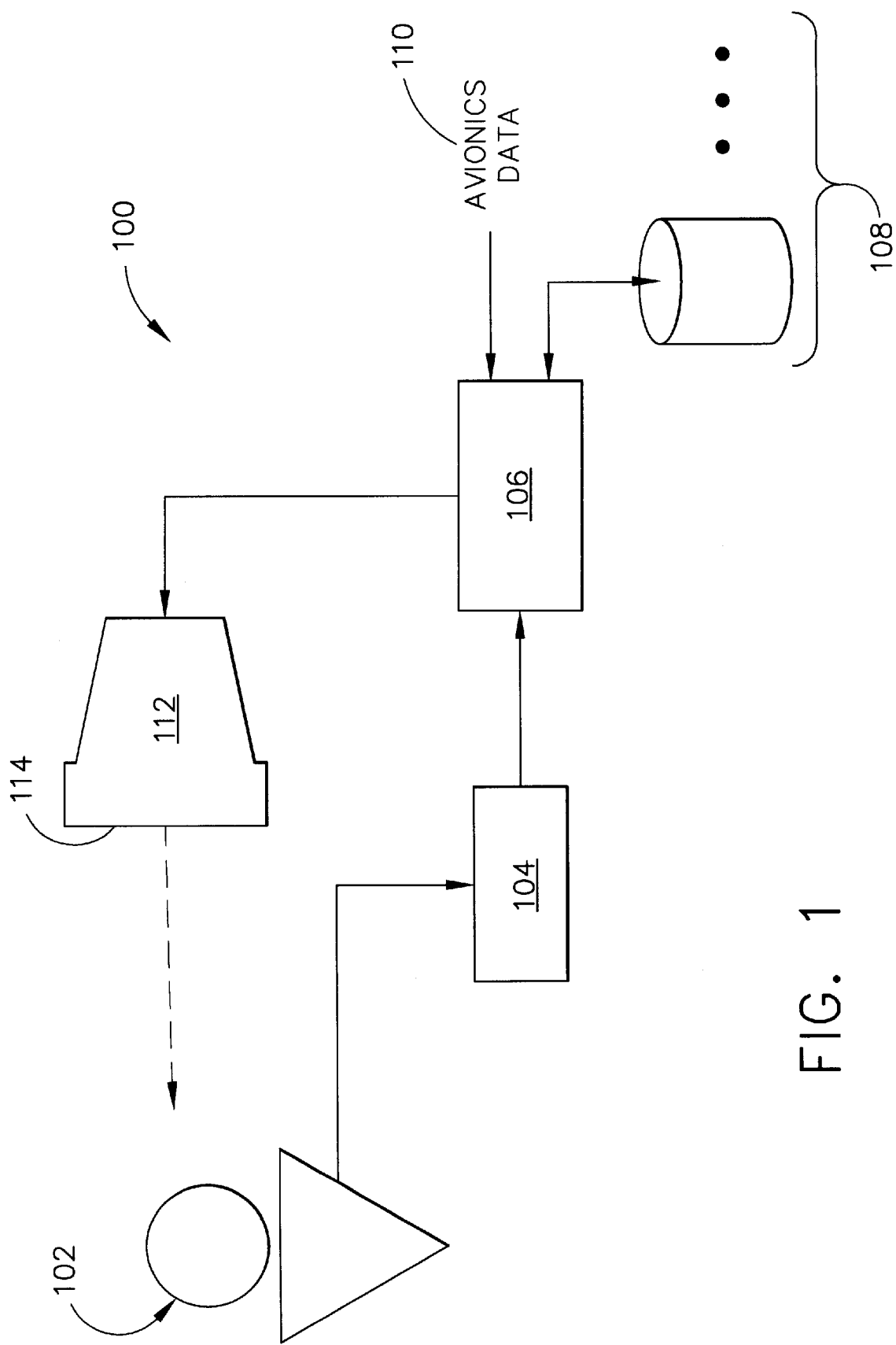
FIG. 1 is a schematic overview of a user interface in accordance with the present invention.

Briefly, referring now to FIG. 1, a system in accordance with various aspects of the present invention comprises a processor 106 configured to communicate with an associated monitor (or monitors) 112, one or more data sources 108, cursor control device 104, and avionics data 10. In general, a user 102 (e.g., a pilot), located within the aircraft (not shown) provides input to processor 106 through cursor control device 104, and receives visual feedback via a display 114 produced by monitor 112. Display 114 includes various graphical elements associated with the lateral position, vertical position, flight-plan and/or other indicia of the aircraft's operational state as determined from avionics data 110 and/or data sources 108. Through use of cursor control device 104, user 102 may modify the flight-plan and/or other such indicia graphically in accordance with feedback provided by display 114.

Cursor control device 104 includes any device suitable to accept input from user 102 and convert that input to a graphical position on display 114. Various joysticks, mice, trackballs, and the like are suitable for this purpose. In one embodiment, cursor control device 104 comprises a touch-pad interface device with a thumb actuation switch on the side. In this embodiment, the user rests his or her hand on a built-in palm-rest to stabilize the hand, position the fingertip for pointing, and position the thumb for clicking.

Monitor 112 may include any display monitor suitable for displaying the various symbols and information detailed below. Many currently known monitors are suitable for this task, including various CRT and flat-panel display systems.

Processor 106 encompasses one more functional blocks used to provide flight management and control, interface with cursor control device 104, and drive monitor 112. In this regard, processor 106 may include any number of individual microprocessors, memories, storage devices, interface cards, and other standard components known in the art.

Avionics data 110 includes standard information related to the state of the aircraft. Data sources 108 include various types of data required by the system, for example, flight plan data, data related to airways, navigational aids (Navaids), symbol textures, navigational data, obstructions, font textures, taxi registration, Special Use Airspace, political boundaries, COM frequencies (enroute and airports), approach info, and the like.

Figure 2:
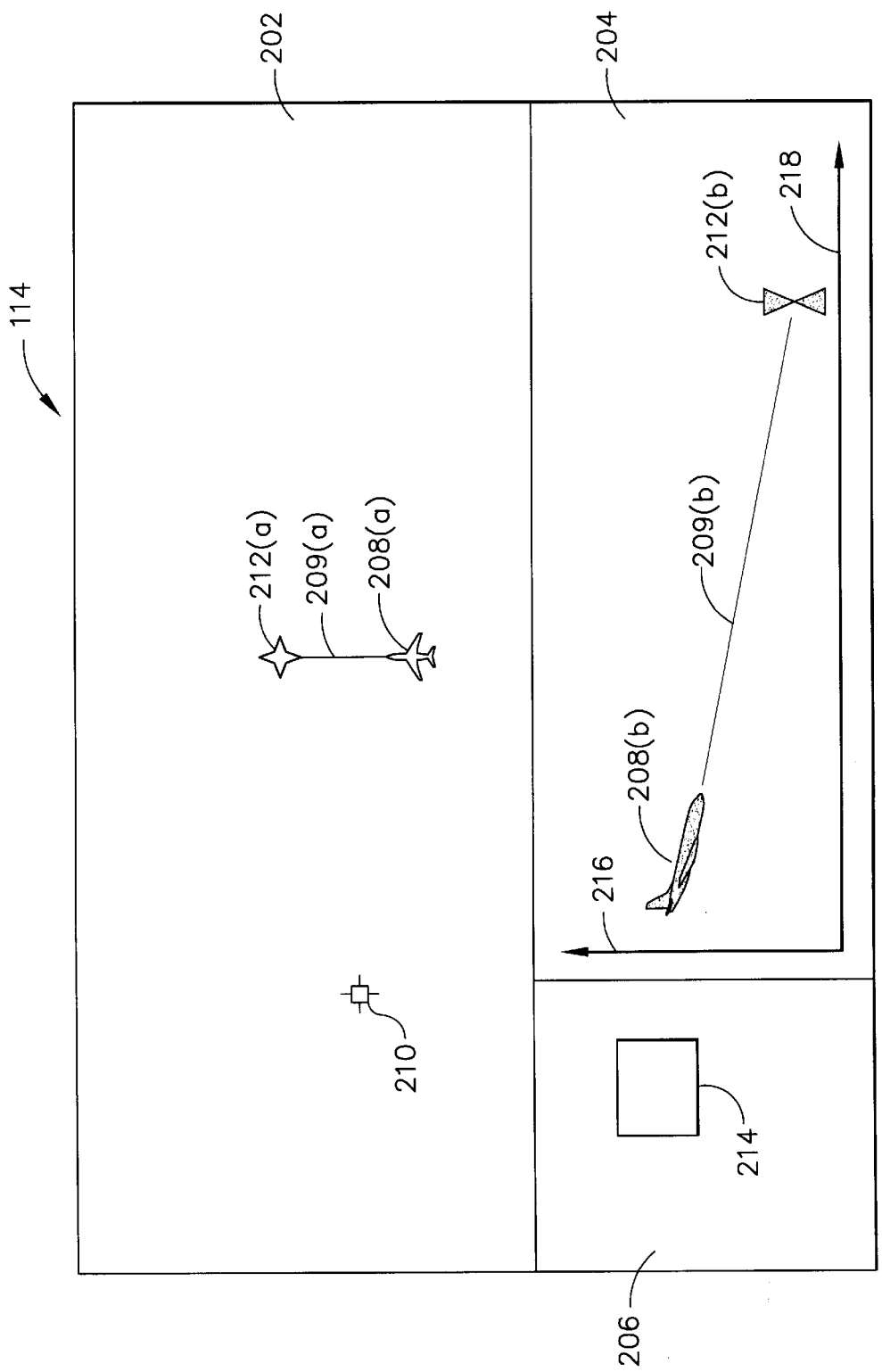
FIG. 2 is a schematic overview of a display arrangement in accordance with one embodiment of the present invention.

Referring now to FIG. 2, a display 114 in accordance with various aspects of the present invention includes a lateral view 202, a vertical profile view (or "vertical profile") 204, and a hot-map view (or simply "hot-map") 206.

Vertical profile 204 suitably includes a side-view aircraft symbol 208(b), one or more waypoint symbols 212(b) (or constraint symbols, described in detail below), line segments 209(a) connecting waypoint symbols 212(b), a first axis 218 representing lateral position and/or time, and a second axis 216 designating altitude. As with the lateral view 202 described above, the system is preferably configured such that the user may modify the flight plan and trajectory via graphical manipulation of symbols 212(b) using cursor symbol 210.

Figure 3B:
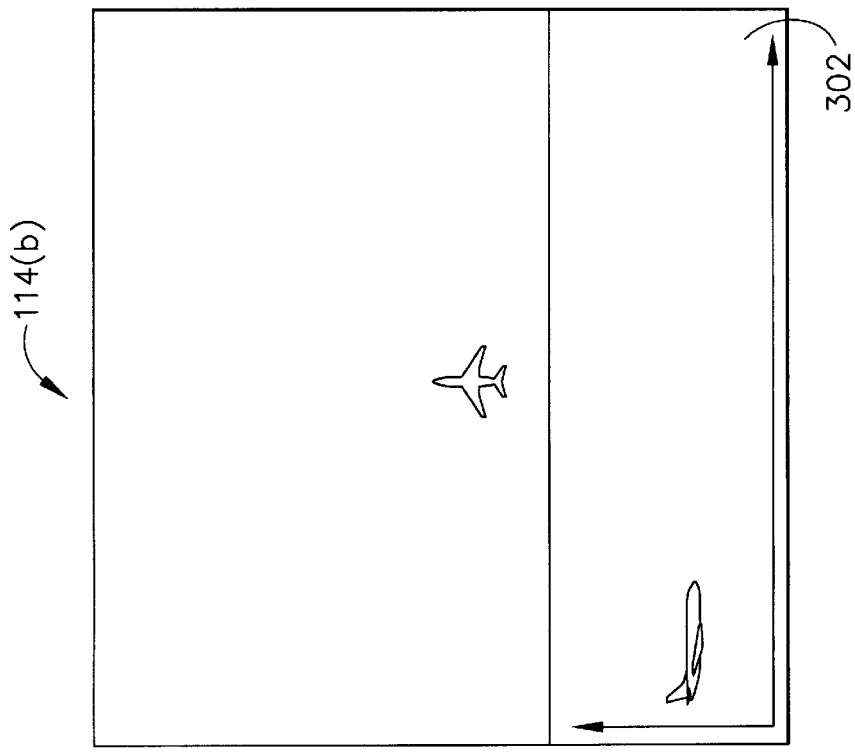
FIGS. 3A and 3B depict a display arrangement in accordance with one embodiment of the present invention, showing an expanding vertical profile display.
Figure 3A:
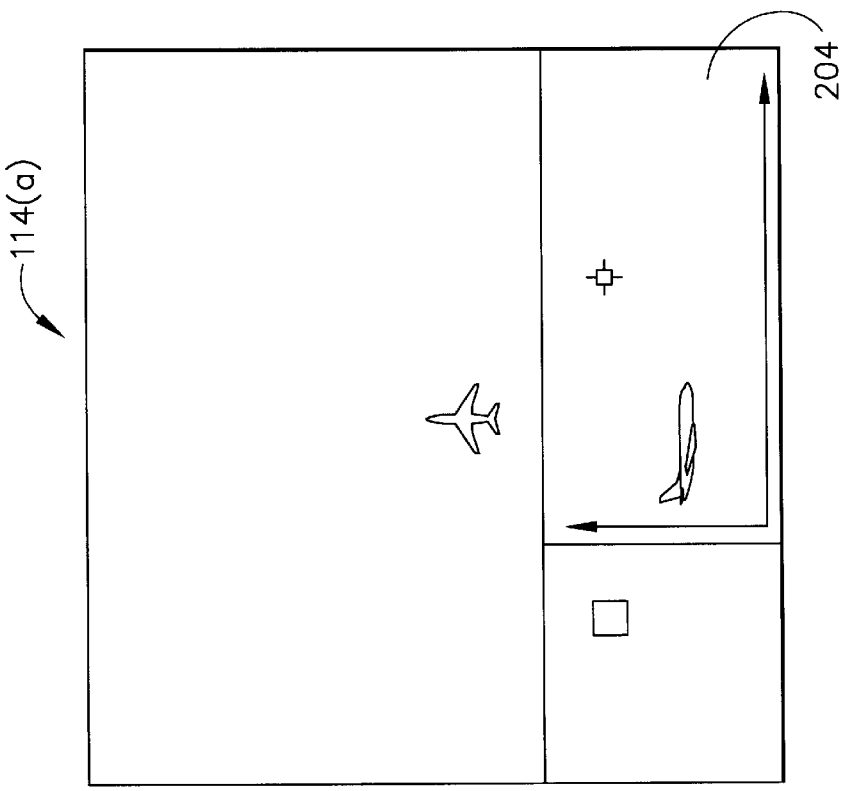

In one embodiment, vertical profile 204 may be expanded to facilitate display and editing of the flightplan. More particularly, referring momentarily to FIG. 3A, when the user clicks cursor 210 within vertical profile 204 of display 114(a), that region expands to fill a larger area 302 of the total display area 114(b).

Figure 5:
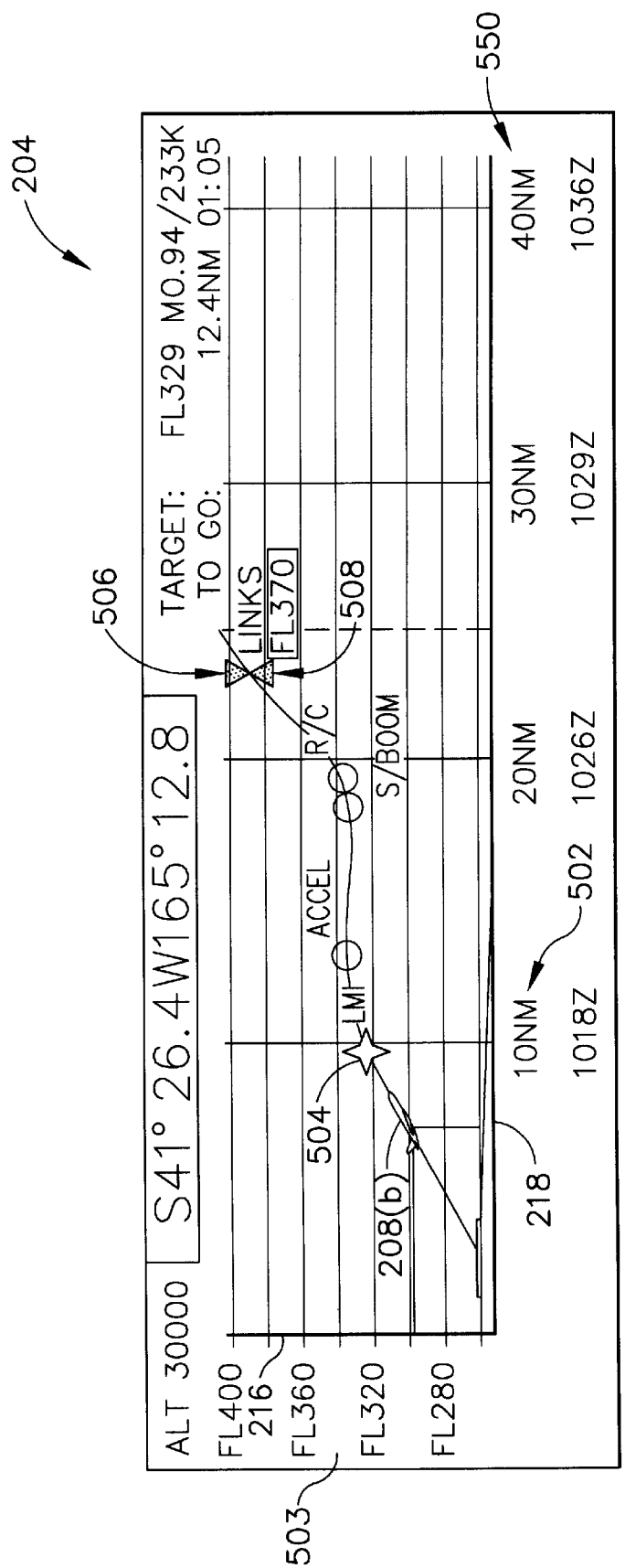
FIG. 5 depicts an exemplary vertical profile view.

Referring now to FIG. 5, an exemplary vertical profile 204 includes a vertical axis 216 graduated with altitude values 503 and a lateral axis 218 graduated with lateral distance values (e.g., nautical miles). "FL" stands for "flight level" and is used in place of altitudes when the aircraft is above 18,000 feet (i.e., FL210 is approximately 21,000 feet). In an alternate values, time values 502 may be displayed in place of or in addition to lateral distance values 502. Aircraft symbol 208(b) is shown having an orientation roughly equivalent to the orientation of the actual aircraft, and the various waypoints are shown via a waypoint symbol 504 or, where altitude constraints are selected, by upper or lower limit symbols (506 and 504 respectively).

Lateral axis 218 is preferably scaled such that it corresponds to the scale of lateral view 202. More particularly, the maximum value 550 of lateral axis 218 is preferably equal to the range specified in the lateral view (described further below).

Figure 6:
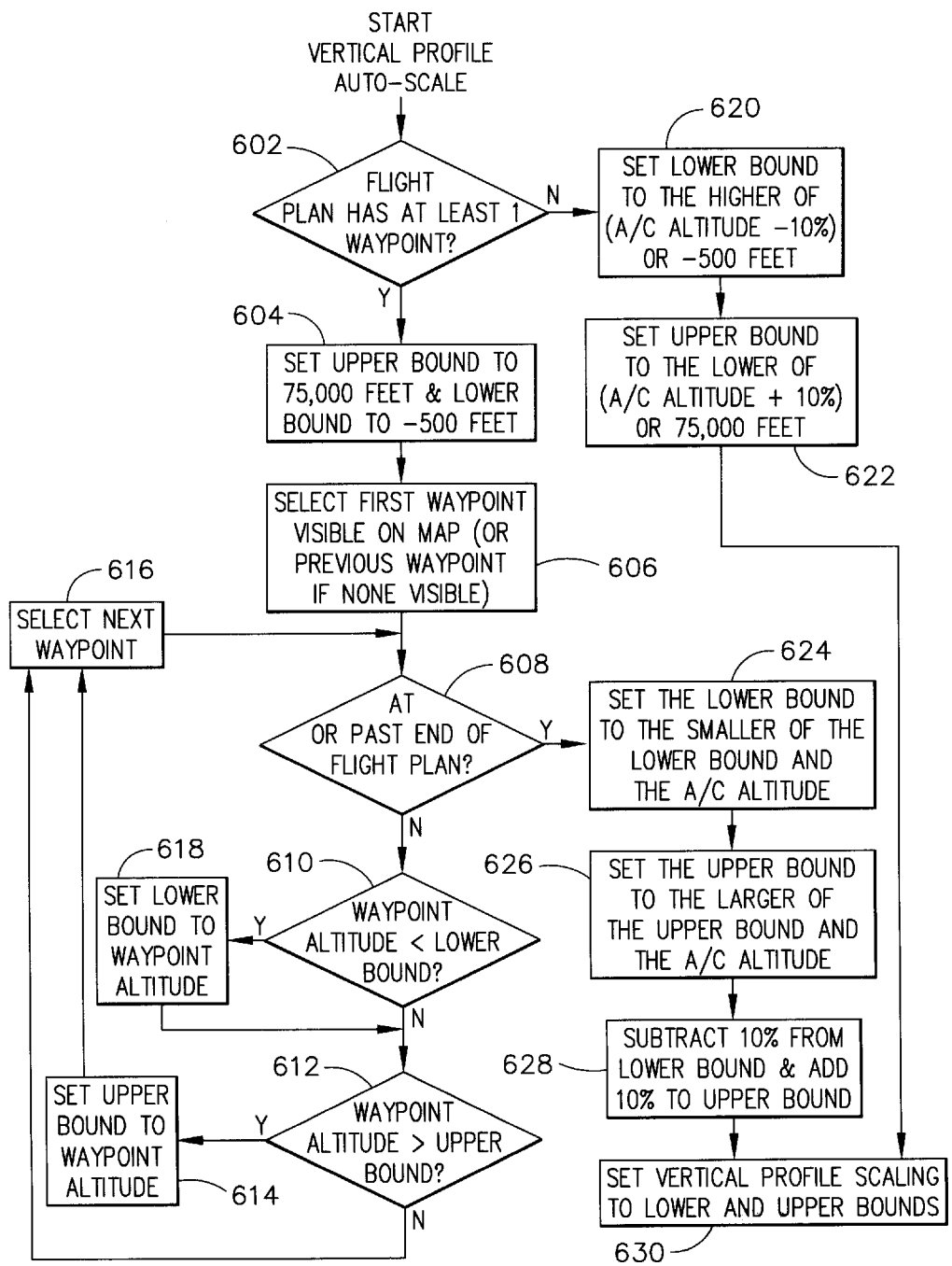
FIG. 6 is a flowchart showing a vertical profile altitude scaling method.

Vertical axis 216 may be scaled manually or, as in the illustrated embodiment, automatically through a scaling algorithm such as that shown in FIG. 6. That is, the system first queries whether the flight plan includes at least one waypoint (step 602). If so, the system sets the lower bound and upper bound of vertical axis 216 in accordance with suitable default values (step 604). In the illustrated embodiment, for example, values of 75,000 feet and −500 feet are used for the default upper and lower bounds respectfully. After setting the default values, the system selects the first visible waypoint or, if none is visible, to the previous waypoint (step 606). The system then queries whether the selected waypoint is at or past the end of the current flight plan (step 608). If not, the system continues as shown in steps 608, 610, 612, 614, and 616. That is, if the waypoint altitude is less than the lower bound, the lower bound is set to the waypoint altitude. Alternatively, if the waypoint altitude is greater than the upper bound, the upper bound is set to the waypoint altitude. The new waypoint is selected (step 616), and the system continues as before until the selected waypoint is at or past the end of the flight plan ("Y" branch of step 608), at which time the system continues at step 624.

In step 624, the lower bound is set to the small of the lower bound and the aircraft altitude. The upper bound is then set to the larger of the upper bound and the aircraft altitude (step 626), and a suitable percentage (e.g., 10%) is subtracted from both the lower and upper bounds (step 628). Finally, in step 630, the vertical profile scale is set to the lower and upper bounds as determined by the algorithm.

Returning to the outcome of query step 602, in the event that the flight plan does not have at least one waypoint, the lower bound is set to the higher of (1) the aircraft altitude minus a predetermined percentage (e.g., 10%), or (2) −500 feet (step 620); and the upper bound is set to the lower of (1) the aircraft altitude plus a predetermined percentage (e.g., 10%), or (2) 75,000 feet. After setting the bounds in this way, the system proceeds to step 630 where the vertical profile scale is set in accordance with the upper and lower bounds.

It should be understood that the exemplary process illustrated may include more or less steps or may be performed in the context of a larger processing scheme. Furthermore, the various flowcharts presented in the drawing figures are not to be construed as limiting the order in which the individual process steps may be performed.

Referring again to FIG. 2, lateral view 202 suitably includes various graphical elements ("symbols") representing, among other things, the lateral position of the aircraft with respect to the ground. The lateral view 202 also may include various map features, including terrain, political boundaries, and the like. In the illustrated embodiment, lateral view 202 includes a top view aircraft symbol 208(a), one or more waypoint symbols 212(a), and line segments 209(a) connecting the waypoint symbols 208(a), wherein the waypoint symbols 212(a) are associated with the current flight-path of the aircraft. Display 114 also preferably includes a cursor symbol 210 positioned in accordance with input from user 102 received via cursor control device 104. While the details of the user's interaction with lateral view 202 will be discussed further below, in general, cursor 210 is suitably positioned by the user in order to select and graphically edit the flight plan associated with waypoints 208(a).

Figure 7:
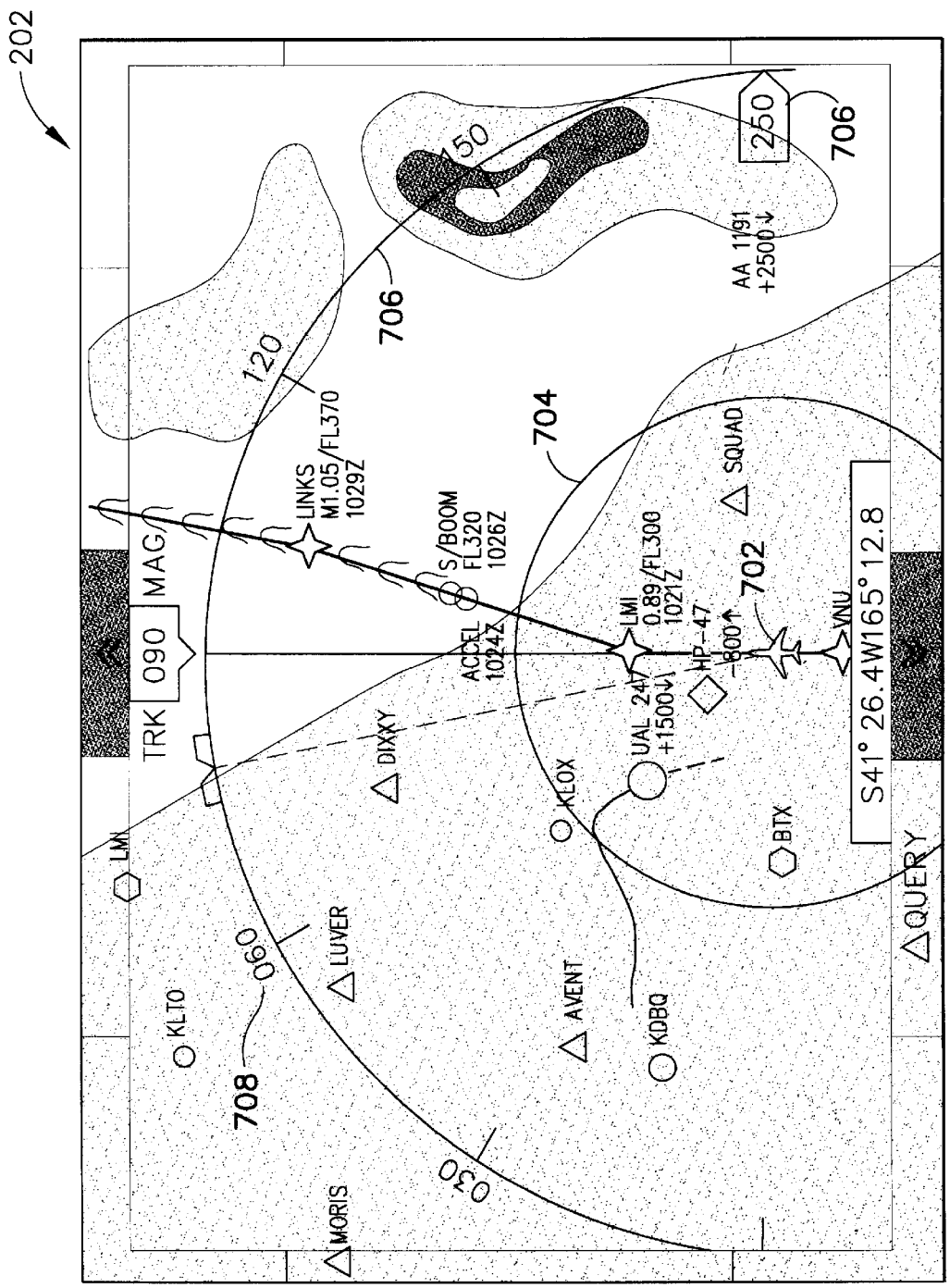
FIG. 7 depicts an example lateral view.

With reference to FIG. 7, lateral view 202 includes one or more range rings 704 and 706 which indicate nautical distance from aircraft icon 702. In the illustrated embodiment, the outer range ring 706 is graduated with compass angle designations 708 and includes a range indicator 706.

Figure 8:
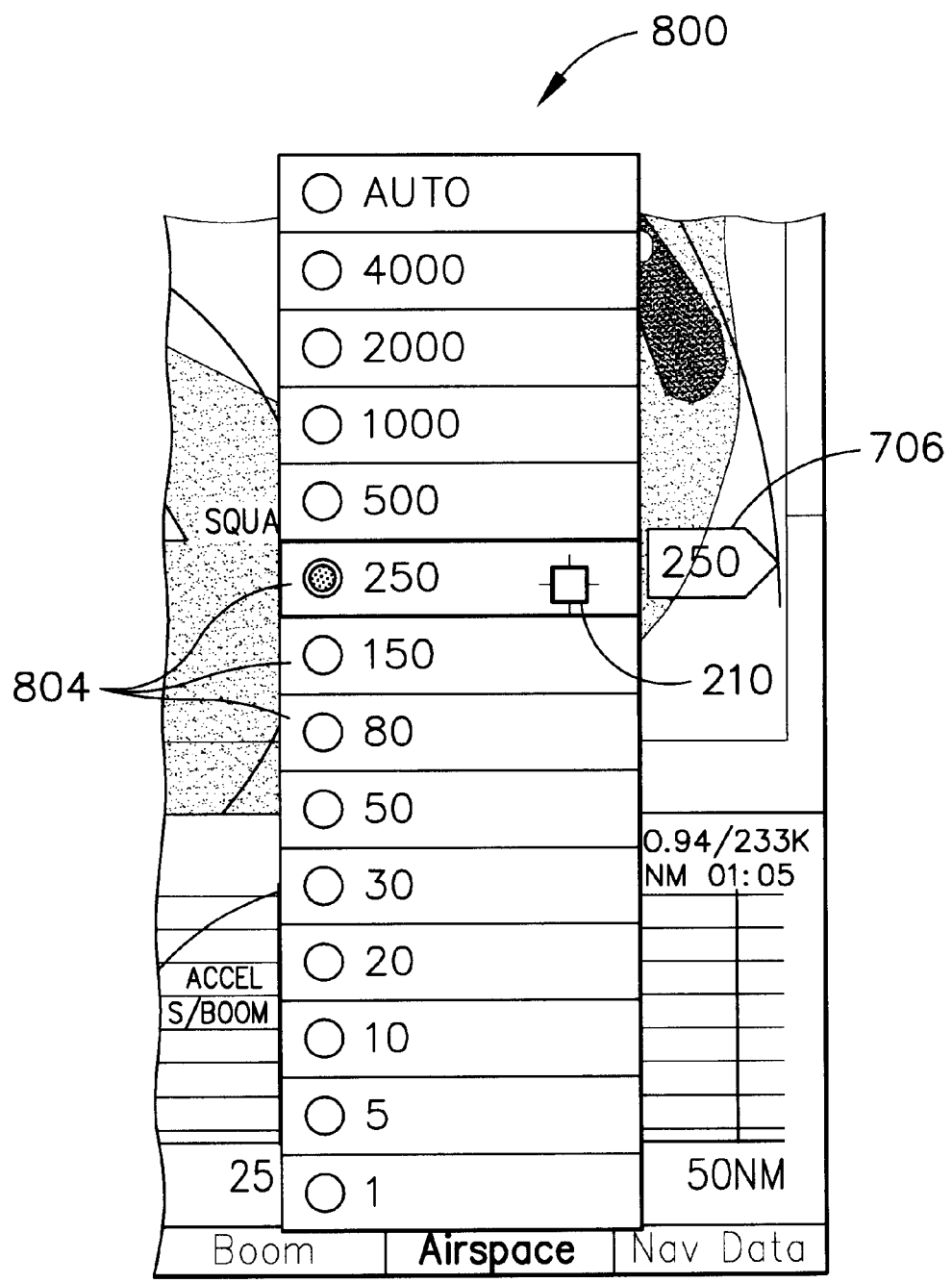
FIG. 8 shows a lateral range pop-up menu.

Range indicator 706 displays the lateral distance from the aircraft to the that portion of lateral display 202 corresponding to outer range ring 706 (in this case, 250 NM). The value of the range indicator (the "range") may be set manually or automatically. More particularly, referring now to FIG. 8, when the user clicks on range indicator 706, a pop-up menu 800 is preferably displayed. Pop-up menu preferably includes a number of predetermined distance values 804 as well as a "auto" option which activates automatic scaling of the lateral display.

Figure 9:
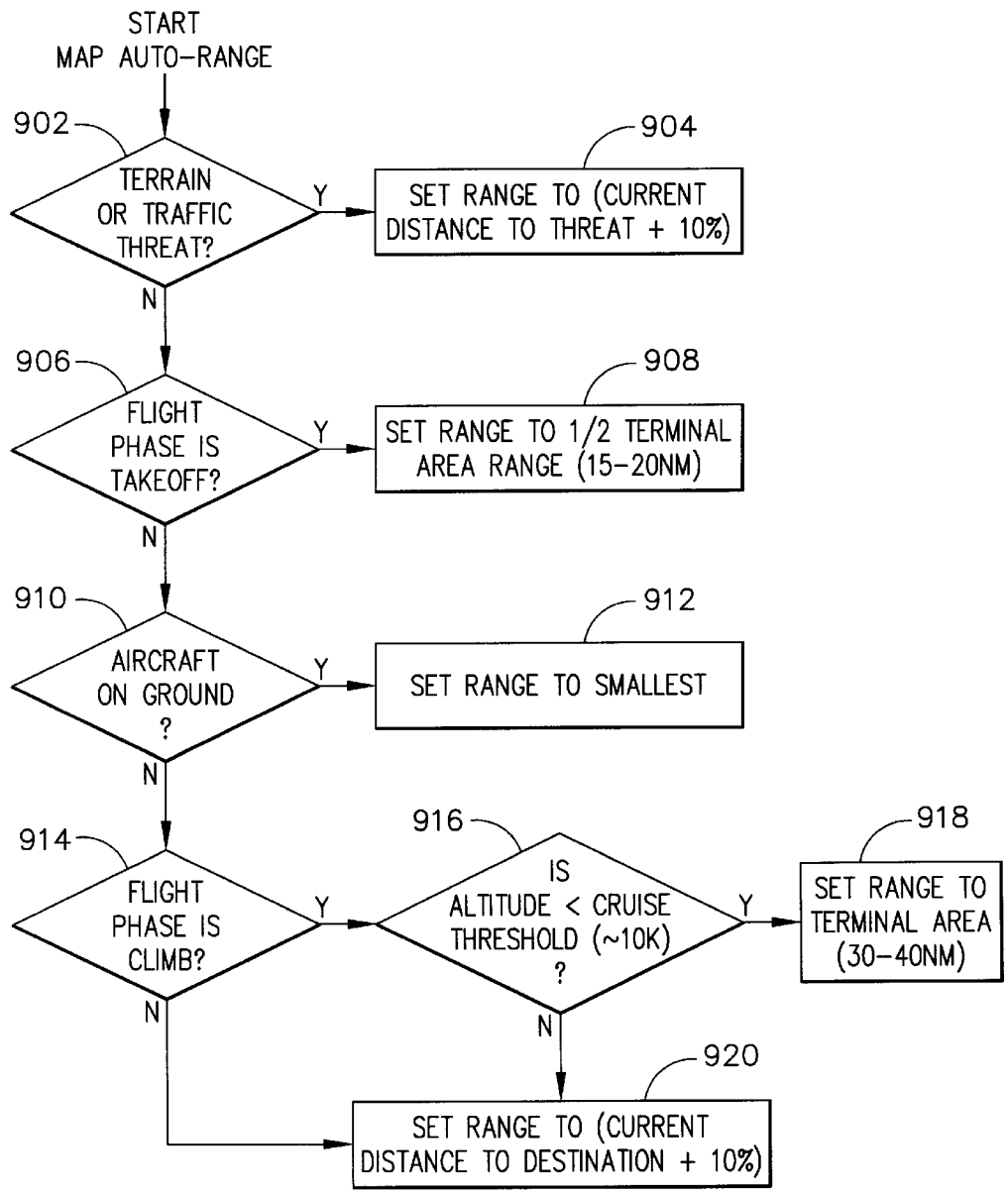
FIG. 9 is a flowchart showing a map autorange method.

FIG. 9 shows an exemplary method of performing automatic scaling. In accordance with this decision tree, the system first queries whether there is a terrain or traffic threat (step 902). If so, the range is set to the current distance to the threat plus a predetermined percentage of the distance (e.g., 10%) (step 904). If there is no terrain or traffic threat, the system queries whether the aircraft is in the takeoff flight phase (step 906). If so, the range is to one-half the terminal area range (e.g., about 15–20 NM) (step 908). Similarly, if the aircraft is on the ground, the range is set appropriately to the lowest available range setting (typically around 1 to 5 nautical miles) (step 912). If the aircraft is in the climb phase (step 914), the system queries whether the altitude is less than the cruise threshold (about 10,000 feet) and, if so, the range is set to the terminal area (e.g., 30–40NM). In the even the altitude is not less than the cruise threshold, or the flight phase is not climb ("N" branches from steps 916 and 914 respectfully), the system sets the range to the current distance to the destination plus a predetermined percentage, e.g., 10%.

In accordance with another aspect of the present invention, lateral view 202 preferably enters a "freeze" state when the user clicks on a feature within the view. That is, it may be difficult for the user to select a particular waypoint or other item while the underlying map is moving, particularly in the case where the range is set fairly low and/or the aircraft is flying at high speed. Similar problems would be experienced where the map is rotating due to the aircraft changing heading. To compensate for these effects, the map preferably enters a freeze state any time the lateral view is scrolled off the aircraft position or when the cursor device is clicked in the lateral view area. In the freeze state, the map does not move under a stationary aircraft symbol; rather, the map becomes fixed and the aircraft symbol moves over it.

The freeze state is preferably signaled to the user via one or more changes in the map symbology. In one embodiment, the map background is shaded gray, the hot-frame color changes, the aircraft symbol changes shape, and the outer range ring and compass scale are removed. The display preferably returns to the normal, non-frozen state when "cancel" or "accept" are selected, or the map center button (not shown) is pressed.

In addition to lateral view 202 and vertical profile 204, the illustrated embodiment includes a hot-map region 206 which encompasses a larger albeit simplified lateral area than that shown in lateral view 202. A rectangular or square outline 214 corresponding to the region shown in lateral view 202 is displayed in hot map 206. In the illustrated embodiment, when cursor 210 is used to select a region within hot-map 206, the lateral view 202 changes accordingly.

Figure 4:
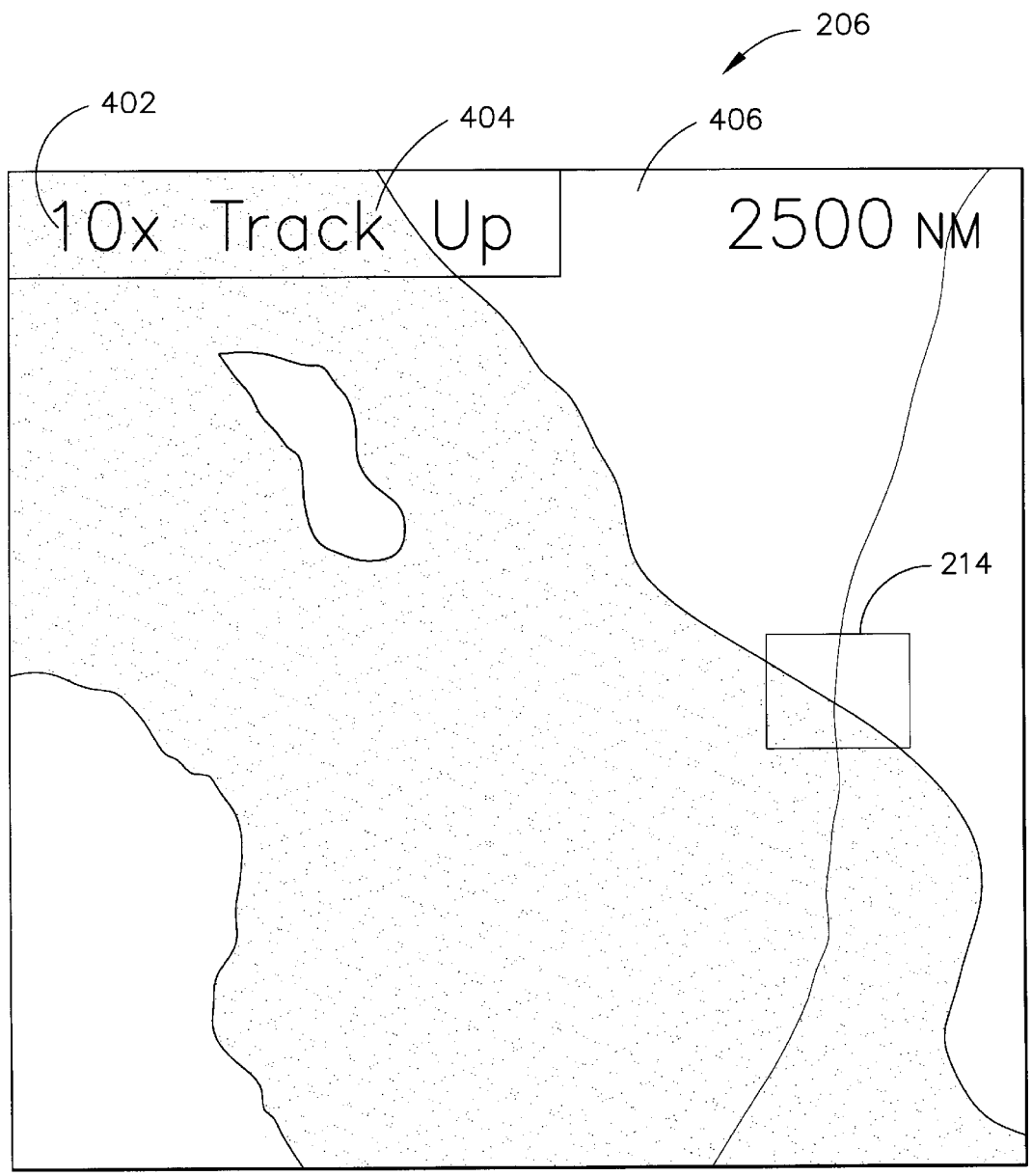
FIG. 4 depicts a hot map in accordance with one embodiment of the present invention.

Referring now to FIG. 4, a hot-map 206 in accordance with one aspect of the present invention includes a scale indicator 402 (indicating the magnification of region 202 with respect to region 206), an orientation indicator 404, and a hot-map range indicator 406. Orientation indicator 404, which is preferably user-configurable, indicates whether lateral region 202 is "track-up" (oriented to the flight plan), or "north-up" (oriented to magnetic or true-north). Hot map 406 preferably includes a simplified terrain display showing, for example, land/water boundaries and the like.

Figure 10A:
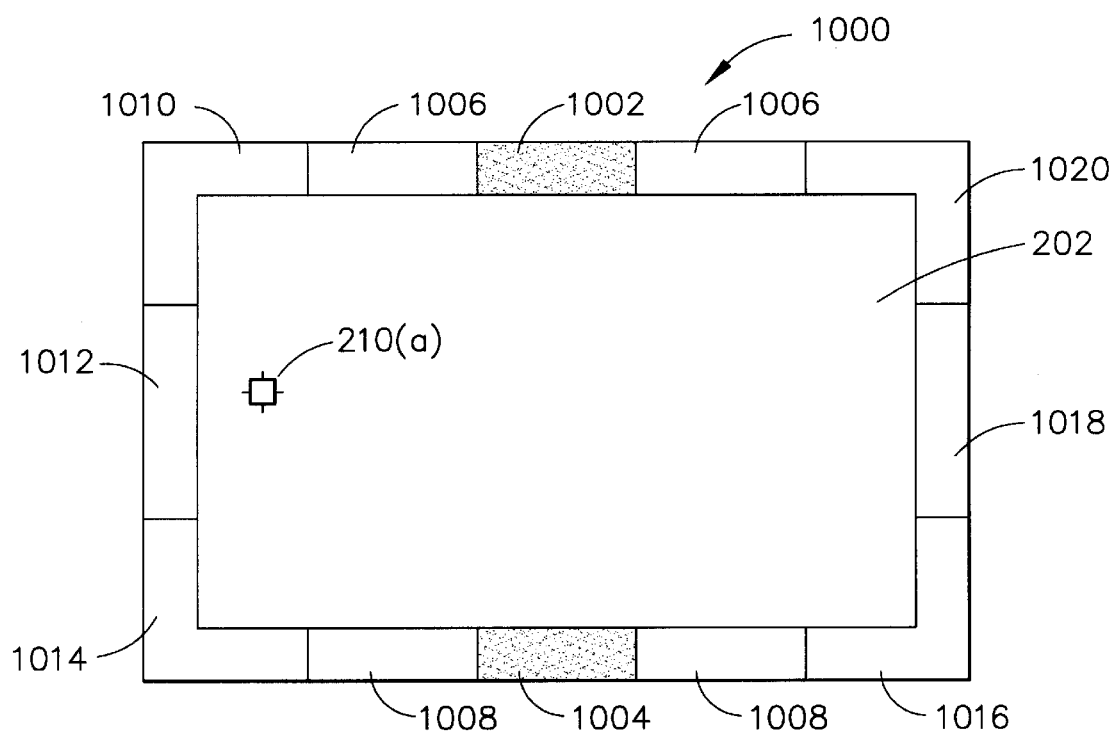
FIGS. 10A and 10B depict an exemplary hot-frame in accordance with one aspect of the present invention.
Figure 10B:
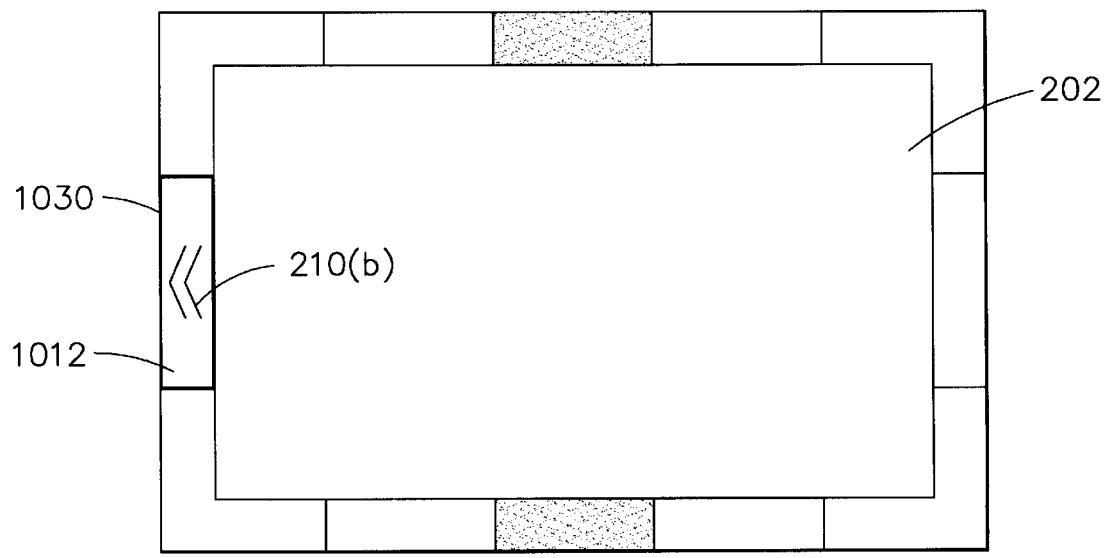

In one embodiment of the present invention, lateral view 202 includes a hot-frame which allows easy scrolling of the lateral map to adjacent regions and/or to previous or subsequent waypoints. More particularly, referring now to FIGS. 10A and 10B, the periphery of lateral view 202 includes a frame 1000 divided into a number of regions 1002–1020 which the user can select (using cursor symbol 210) to facilitate scrolling in the corresponding direction. The number and position of the regions may vary in accordance with the present invention; however, in the illustrated embodiment, scrolling can be effected in eight directions: up (1006), down (1008), right (1018), left (1012), and the four diagonal directions (1010, 1020, 1016, and 1014). Region 1002 allows scrolling to the next waypoint, and region 1004 allows scrolling to the previous waypoint.

It will be appreciated that the magnitude of the scroll across region 202 should not be so extreme as to cause confusion with respect to spatial continuity. Hence, in one embodiment, the scroll distance is equal to between 0.25 and 0.5 times the full scale horizontal or vertical distance across region 202, preferably about 0.33 times full scale.

In the illustrated embodiment, certain visual cues are used to signal to the user that hot-frame 1000 has been activated. For example, the shape of the cursor may change and/or the relevant hot-map region may be suitably highlighted. In one embodiment, for example, cursor symbol 210(a) changes from the default symbol (in this case, a cross-hair symbol), to a pair of arrows 210(b) pointing in the scroll direction. In addition, the perimeter 1030 of hot-scroll region 1012 is changed to a greater line width to indicate the highlighted region.

In an alternate embodiment, hot-frame 1000 is not separated into individual regions. Rather, scrolling is effected in a direction defined by a vector from the center of region 202 to cursor symbol 210. That is, the hot-frame provides 360-degree scrolling. In yet another embodiment, hot-frame 1000 is not normally visible, but only becomes visible when the user moves cursor symbol 210 toward the periphery of region 202.

Figure 11A:
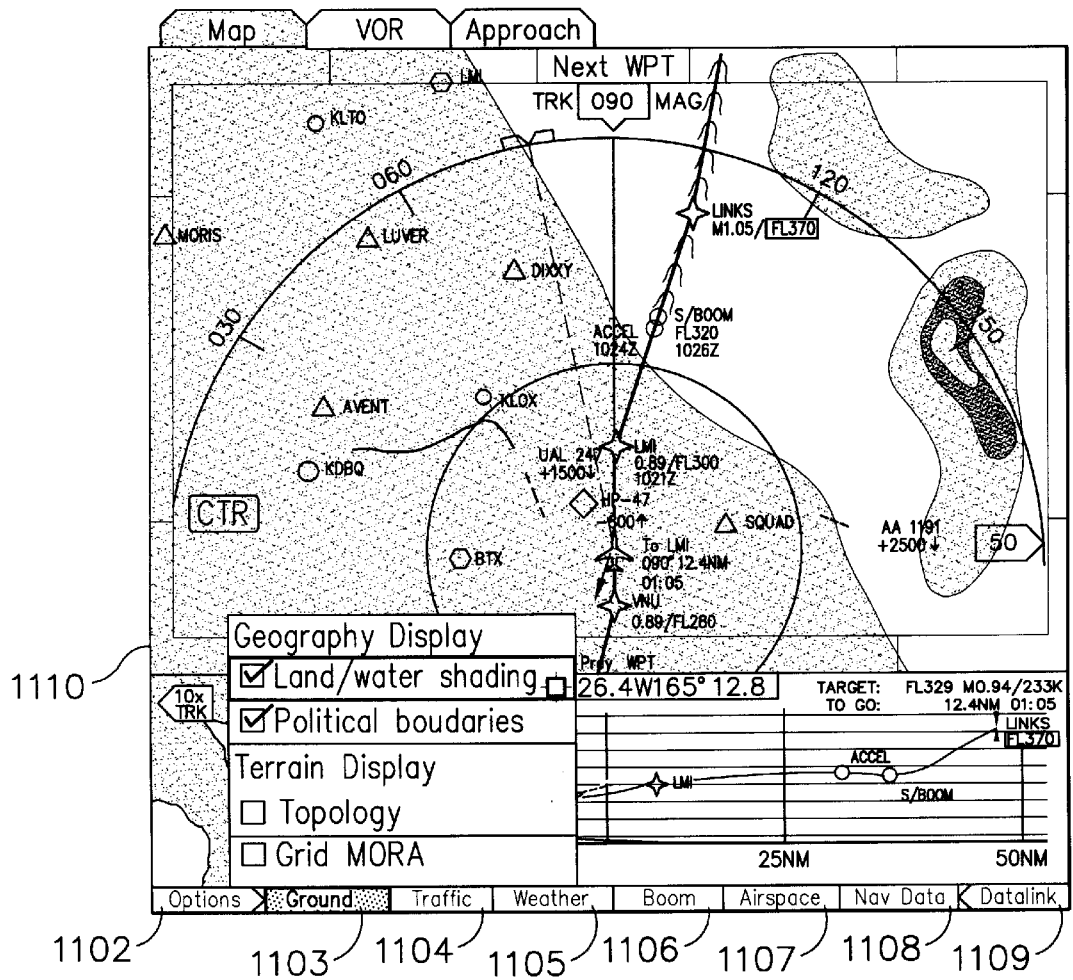
FIGS. 11A–11F show an example set of annunciators.
Figure 11B:
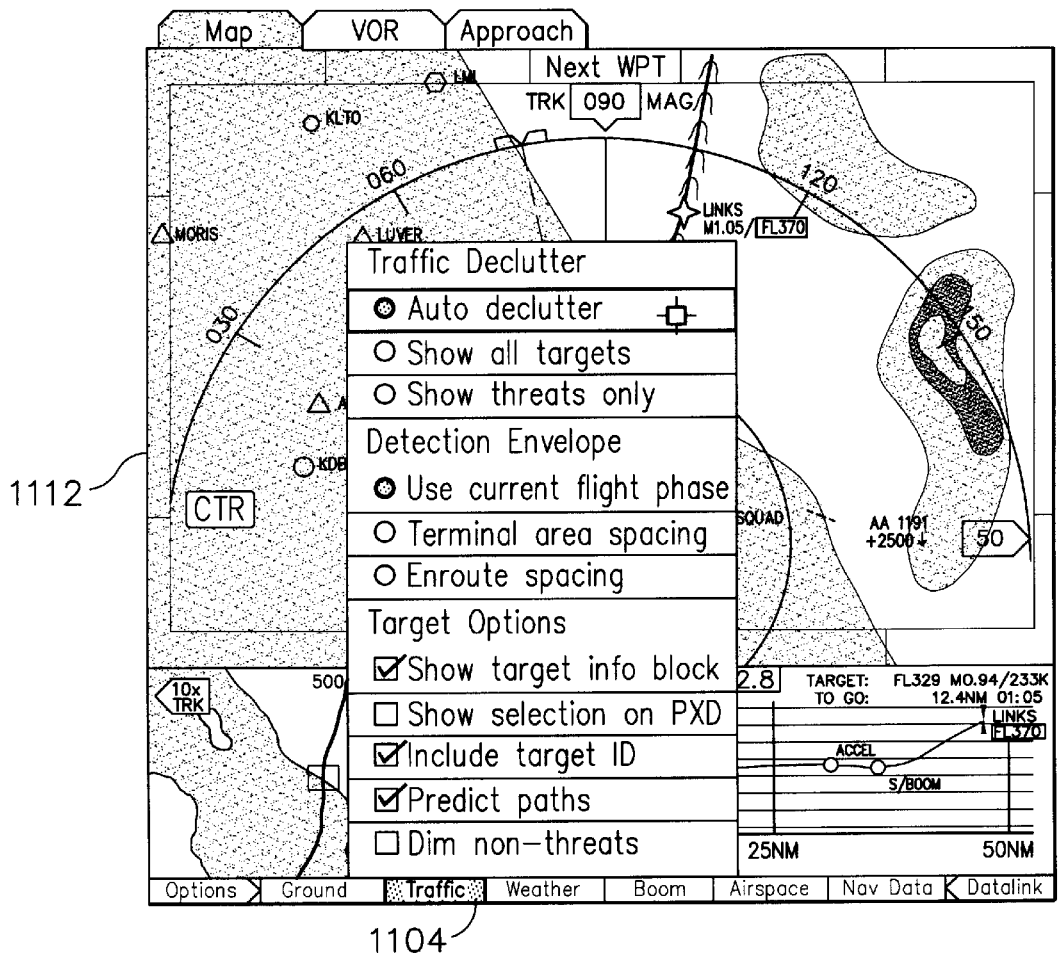
Figure 11C:
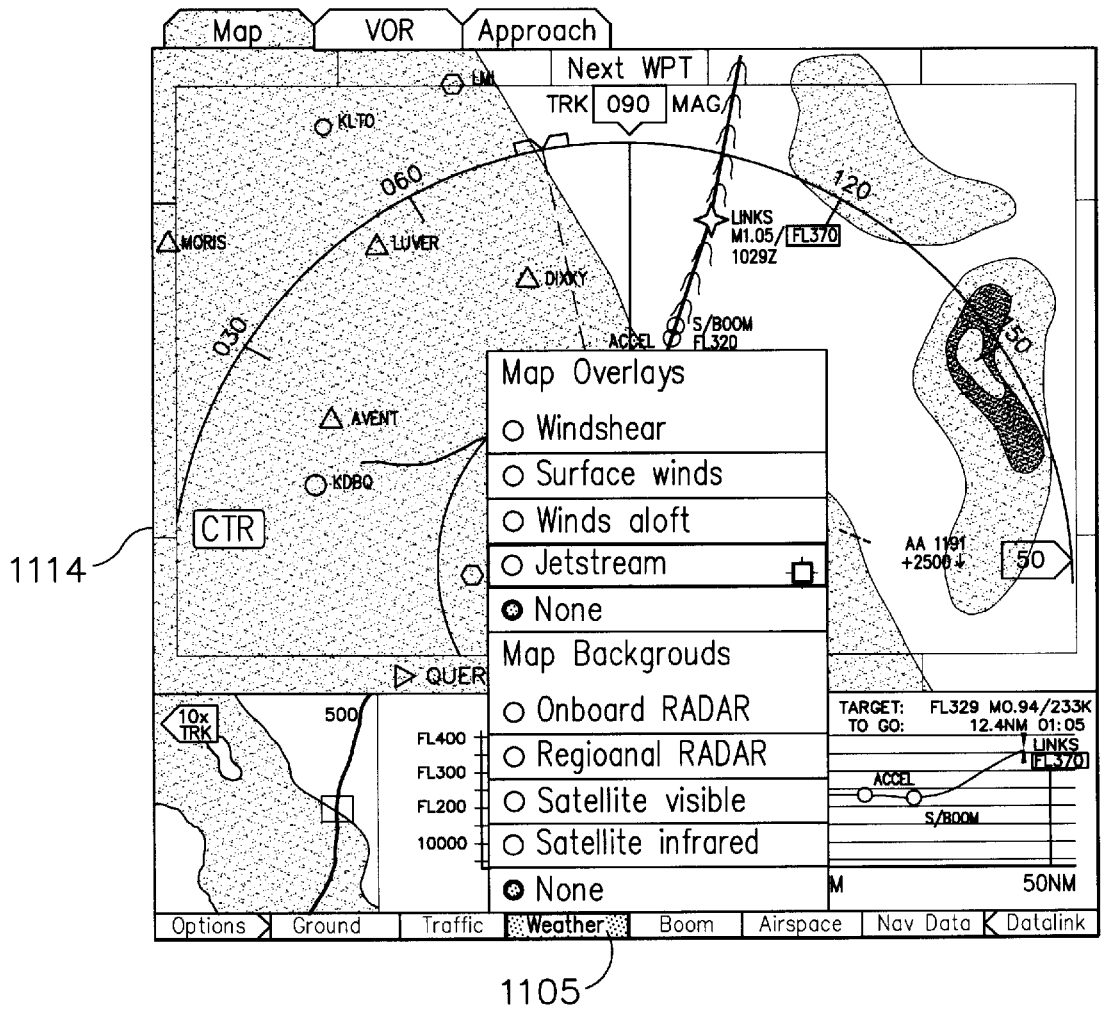
Figure 11D:
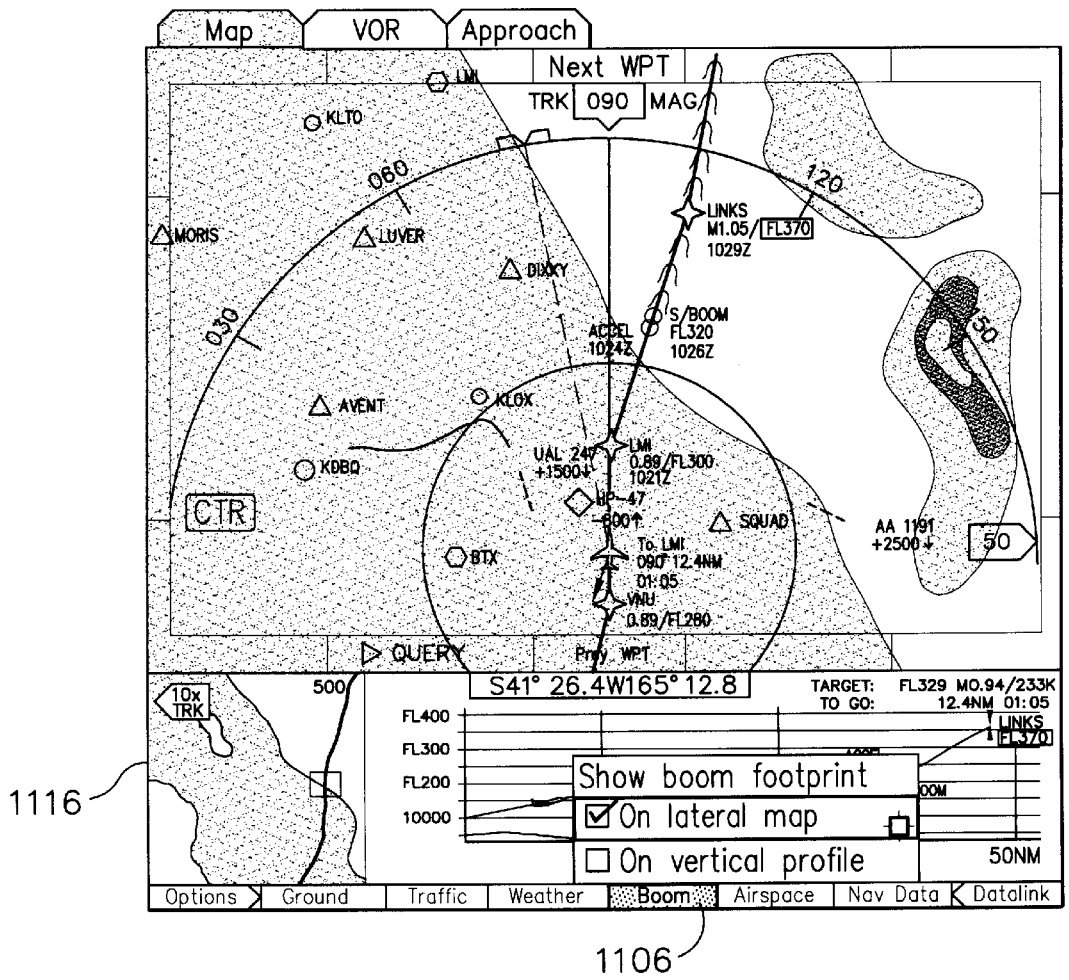
Figure 11E:
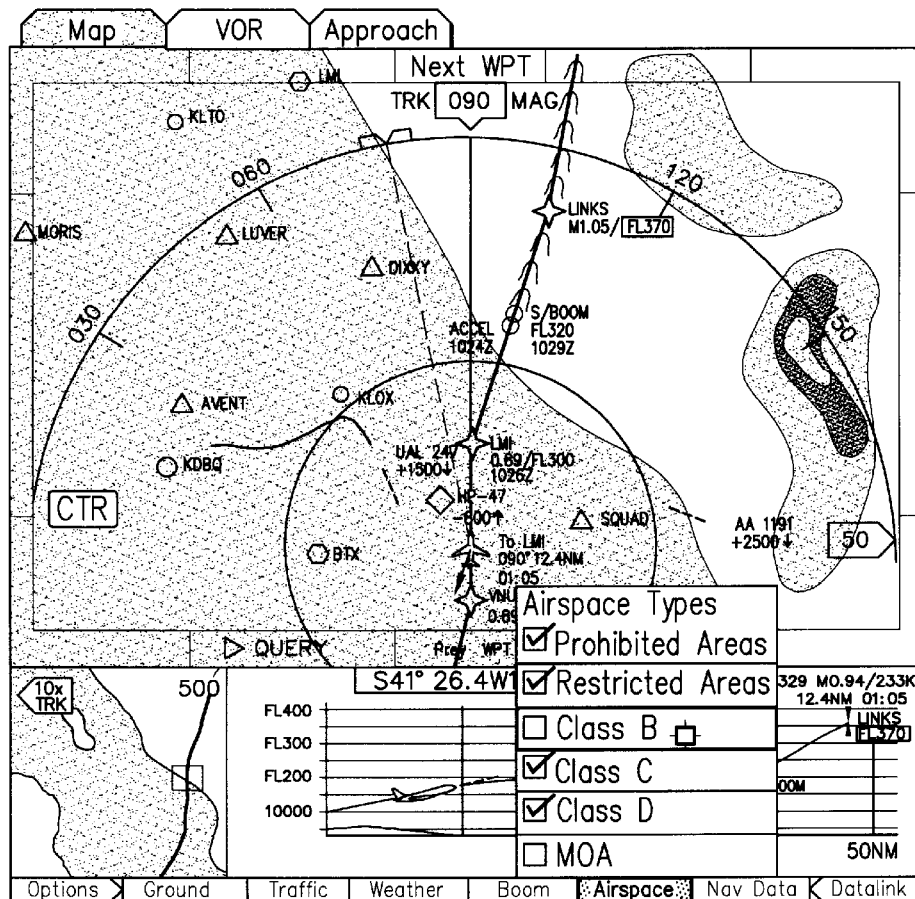
Figure 11F:
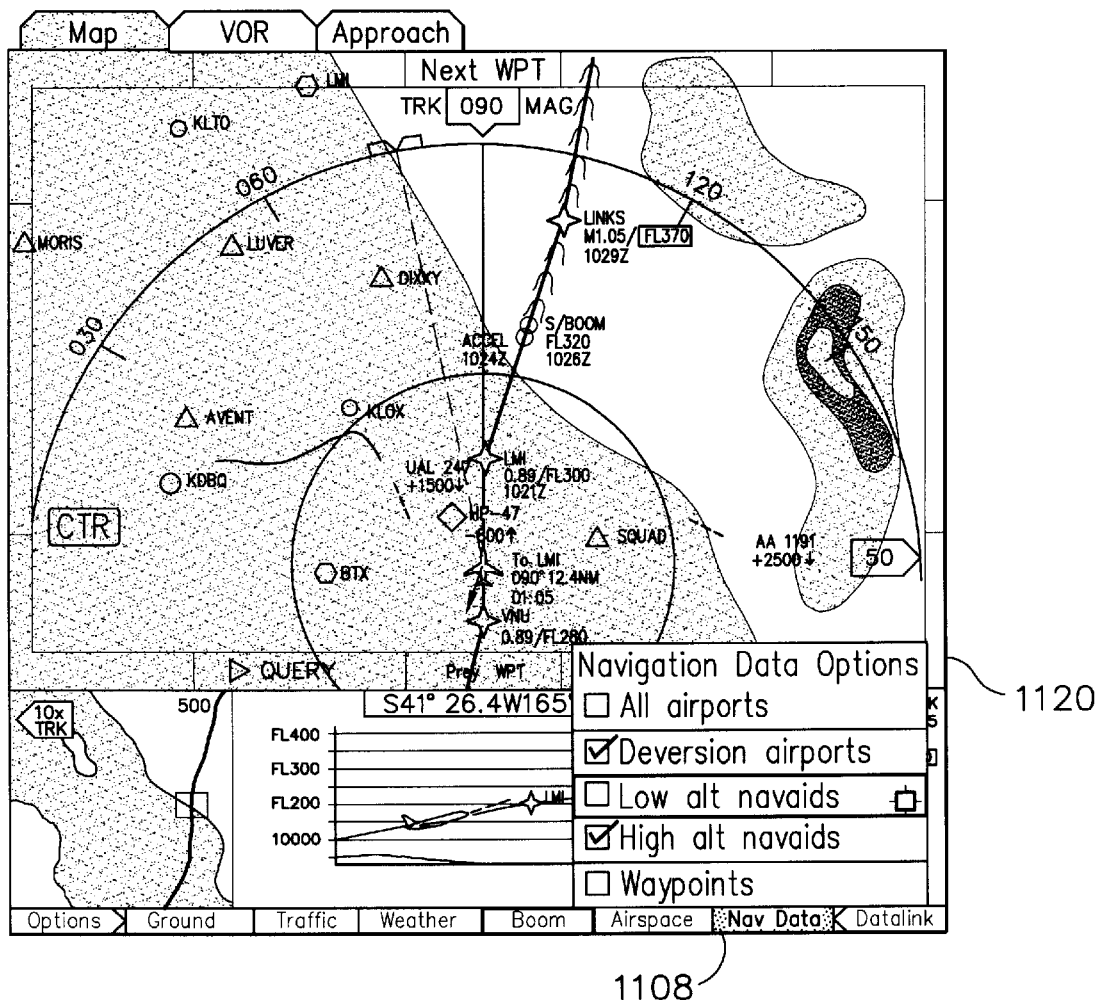

In accordance with another aspect of the present invention, the display suitably includes a series of menu items which function, in some cases, as both pop-up menus and annunciators. FIGS. 11A–11F show one particular example of such annunciators. In FIG. 11A, a series of annunciators 1102–1109 are displayed, including Options, Ground, Traffic, Weather, Boom, Airspace, Nav Data, and Datalink. In general, these menu items are annunciators in that they are color coded depending upon whether the various selected options within that menu are active. That is, by double-clicking on any particular annunciator, the system toggles between a state where none of the options are active and a state where the previously selected options are active. Each state is indicated via color-coding or any other identification means.

Ground annunciator 1103, shown in FIG. 11A, includes a pop-up menu 1114 which controls geography display (land/water shading, political boundaries), and terrain display (topology, grid MORA). Traffic Annunciator 1104 (FIG. 11B) includes options 1112 for traffic declutter (Auto, Show all, Show threats), detection envelope (user current flight phase, terminal area spacing, enroute spacing), and target options (show info block, show selection on PXD, include target ID, predict paths, dim non-threats).

Weather annunciator 1105 (FIG. 11C) includes options 1114 for map overlays (windshear, surface winds, winds aloft, jetstream, none), and map backgrounds (onboard RADAR, regional RADAR, Satellite visible, Satellite infrared, none).

Boom annunciator 1106 (FIG. 11D), applicable only in supersonic aircraft, includes options 1106 for showing the sonic boom footprint on the lateral map and/or the vertical profile. Airspace annunciator 1107 (FIG. 11E) includes options 1118 for airspace types (e.g., prohibited, restricted, class B-D, and MOA). Nav Data annunciator 1108 includes options 1120 related to navigational data (e.g., all airports, diversion airports, low altitude navaids, and waypoints).

Figure 12:
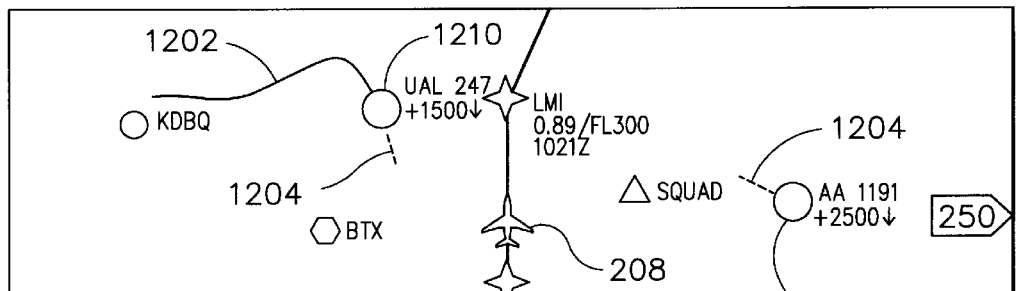
FIG. 12 shows a traffic prediction and history display in accordance with one aspect of the present invention.

In the illustrated embodiment, the user may choose to display the history of nearby aircraft traffic and/or the predicted path of such traffic. More particularly, referring now to FIG. 12, the lateral view may be configured to display symbols 1210 indicative of nearby aircraft, along with the predicted path 1204 and historical path 1202 of each aircraft. A variety of symbols may be used for these elements, and any convenient criteria may be used to determine the sizes and lengths of the displayed paths. In the illustrated embodiment, a dotted line segment is used to designate the predicted path, and a continuous curve is used to designate history.

Figure 13:
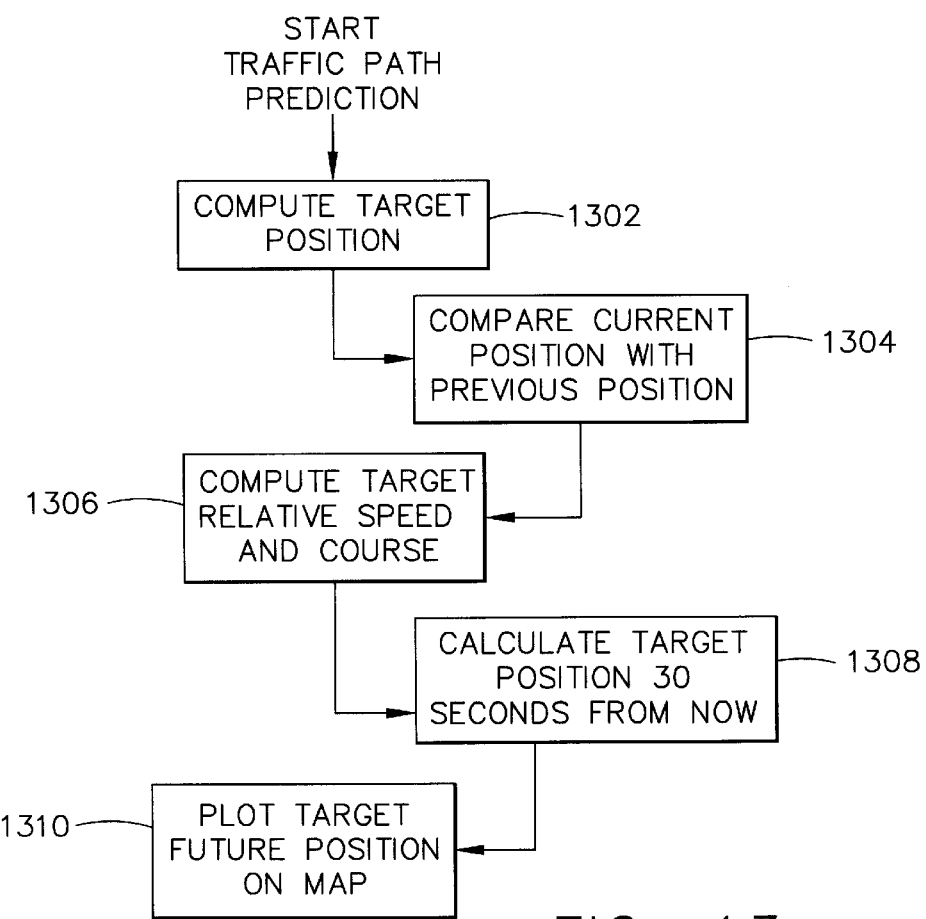
FIG. 13 is a flowchart showing an example traffic path prediction method.

FIG. 13 shows an example algorithm useful for performing path prediction. First, in step 1302, the system computes the position of the target (i.e., the aircraft whose path is to be predicted). Next, the current position of the target is compared to the previous position of the target (step 1304). Given the time between computations and calculated positions, the system computes the relative speed and course of the target (step 1306). Next, the target position is computed for a predetermined time in the future (e.g., 30 seconds), and the target position is suitably indicated on the display. This path prediction is not used when both aircraft are equipped with Automatic Dependent Surveillance-Broadcast (ADS-B) systems.

Figure 14:
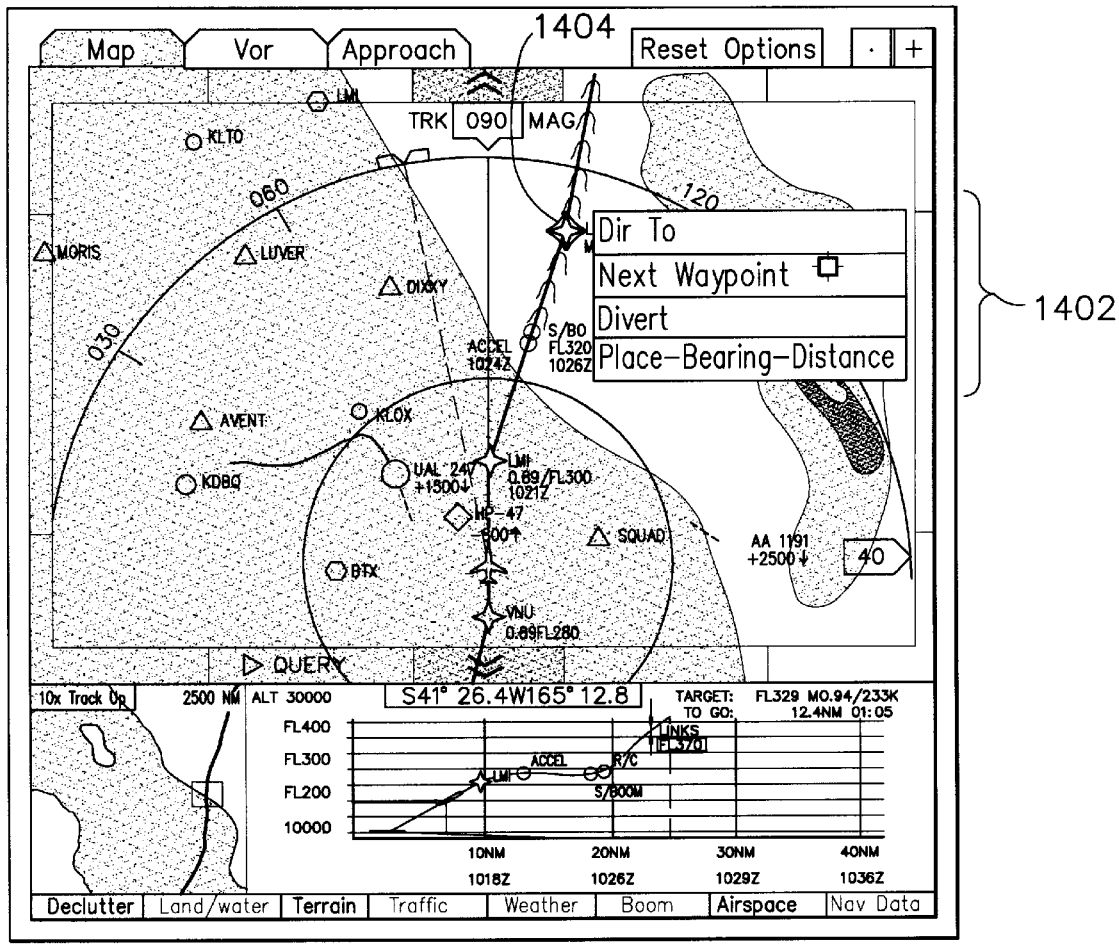
FIG. 14 shows an exemplary pop-up menu associated with selection of a waypoint in the lateral view.

As mentioned briefly above, systems in accordance with the present invention preferably provide the ability to graphically modify and/or enter flight-plan information via the cursor-control device. Referring now to FIG. 14, when the user clicks a particular waypoint 1404, the waypoint is suitably highlighted to indicated that it has been selected (in this case, by a diamond-shaped outline), and a menu 1402 is displayed. Menu 1402 suitably lists various flight-plan modification options which are based on the position of waypoint 1404. In the illustrated embodiment, four options are presented: "Dir To" (direct to), "Next Waypoint", "Divert", and "Place-Bearing-Distance".

The "Direct To" option allows the user to modify the flight plan to proceed directly to the selected waypoint. That is, referring now to Figs. 15A and 15B, the aircraft symbol 1502 is accompanied by the current flight-plan defined by waypoints 1504, 1506, and 1508, where waypoint 1508 has been selected. After selecting the "Dir To" option, the intervening waypoints 1506 and 1504 are deleted, and the flight-plan is simplified as a direct path from aircraft 1502 to waypoint 1508. The user is preferably provided an option to cancel or accept the selected changes to the flight plan. After clicking the waypoint or location to proceed to, the user may then continue to append additional waypoints by continuing to move the cursor and clicking on the appropriate locations.

The "Next Waypoint" option (FIG. 14) allows the user to add one or more waypoints after the selected waypoint. With reference to FIGS. 16A and 16B, the user selects a waypoint (1604) and clicks on the "Next Waypoint" option. The user may then use the cursor controlled device to reposition a new waypoint 1612. The new waypoint is preferably connected to the originally-selected waypoint 1604 via "rubber-banded" line segment 1610 which follows the movement of new waypoint 1612. Line segment 1610 is preferably of a different color and/or style than that that used with the current flight-plan (e.g., segment 1605). For example, in one embodiment, a magenta line segment is used in connection with this rubber-banding function.

When the user accepts the change, the flight-plan is modified (FIG. 16B) such that the new flight-plan rejoins the previous flight-plan (as shown) or results in a "hole" in the flight plan (appropriate in some circumstances).

The "Divert" option (FIG. 17) allows the user to insert one or more waypoints while simultaneously changing the route destination. That is, after selecting waypoint 1704, the user may insert a first new waypoint 1710, followed by a second new waypoint 1712 (using rubber-banding as described above). After accepting the changes, the flight plan is modified accordingly (FIG. 17B).

The "Place-Bearing-Distance" option (FIG. 18) allows the user to insert a waypoint which is identified by a bearing and distance from the selected waypoint. For example, the user may select waypoint 1802 and define a new point 1808 which is a given angle 1804 from a reference axis and a given distance from the original point 1802.

In an alternate embodiment, the user may be allowed to insert one or more waypoints between two existing waypoints. For example, referring to FIG. 19, a new point 1906 is defined between two existing waypoints 1904 and 1902. After the modification is accepted, the flightplan will be changed accordingly.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A system for graphically editing an aircraft flight-plan, said system comprising:

a cursor control device configured to accept two-dimensional coordinate input from a user;

a processor coupled to said cursor control device, said processor configured to process said two-dimensional coordinate input from said user and produce a display on said monitor viewable by said user, wherein said display includes: a cursor symbol responsive to said two-dimensional coordinate input from said user; and at least one waypoint associated with said flight-plan of said aircraft;

said processor further configured to allow selection and editing of said at least one waypoint by said user using said cursor control device.

2. The system of claim 1, wherein said processor is configured to access avionics data associated with said aircraft.

3. The system of claim 1, wherein said processor is configured to access at least one data source.

4. The system of claim 1, wherein said cursor control device includes a touch-pad interface.

5. The system of claim 1, wherein said display includes a vertical profile, said vertical profile including an aircraft symbol, a first axis representing lateral position of said aircraft, and a second axis representing the altitude of said aircraft.

6. The system of claim 5, wherein said vertical profile is configured to expand in response to said user selecting a region within said vertical profile.

7. The system of claim 5, wherein said vertical axis is automatically scaled.

8. The system of claim 1, wherein said display includes a lateral view, said lateral view including an aircraft symbol and at least one of said waypoints.

9. The system of claim 8, wherein said lateral view further includes terrain information.

10. The system of claim 8, wherein said lateral view further includes at least one range ring and a range indicator.

11. The system of claim 10, wherein said range indicator includes a pop-up menu, said pop-up menu including at least one predetermined range value and an auto-scale option.

12. The system of claim 10, wherein said lateral view enters a freeze state when said user selects a symbol within said lateral view.

13. The system of claim 12, wherein said freeze state is signaled to said user through visual cues.

14. The system of claim 8, wherein said display further includes a hot-map, said hot-map including a rectangular region corresponding to said lateral view.

15. The system of claim 14, wherein said hot-map is configured to reposition said rectangular region in response to said input from said user.

16. The system of claim 14, wherein said hot-map further includes a scale indicator, an orientation indicator, and a hot-map range indicator.

17. The system of claim 8, further including a hot-frame configured to allow scrolling of said lateral view in response to said input from said user.

18. The system of claim 17, wherein said hot-frame comprises a frame surrounding the perimeter of said lateral view.

19. The system of claim 18, wherein said hot-frame includes a plurality of regions associated with one or more scrolling directions.

20. The system of claim 19, wherein said hot-frame further includes a next waypoint region and a previous waypoint region.

21. The system of claim 18, wherein said cursor symbol changes shape in response to said cursor entering said hot-frame.

22. The system of claim 1, wherein said display further includes a plurality of annunciators, at least one of said annunciators configured to display a pop-up menu in response to said user input.

23. The system of claim 8, wherein said lateral view includes a traffic prediction symbol.

24. The system of claim 8, wherein said lateral view includes a traffic history symbol.

25. The system of claim 1, wherein said selection and editing of said at least one waypoint is performed in response to said user selecting a waypoint and selecting an option presented in a pop-up menu.

26. The system of claim 25, wherein said editing of said selected waypoint includes rubber-banding from said selected waypoint to a second waypoint.

* * * * *